United States Patent
Williamson et al.

(10) Patent No.: US 7,240,943 B2
(45) Date of Patent: Jul. 10, 2007

(54) INDEPENDENT DIVAN DOOR AND DRAWER ASSEMBLY

(75) Inventors: John Williamson, Davie, FL (US); Sreekanth Chintapudi, Weston, FL (US)

(73) Assignee: B/E Aerospace, Inc., Wellington, FL (US)

( * ) Notice: Subject to any disclaimer, the term of this patent is extended or adjusted under 35 U.S.C. 154(b) by 14 days.

(21) Appl. No.: 10/944,488

(22) Filed: Sep. 17, 2004

(65) Prior Publication Data

US 2006/0061121 A1    Mar. 23, 2006

(51) Int. Cl.
*A47C 7/62* (2006.01)

(52) U.S. Cl. .............. 296/37.15; 297/188.08; 297/188.11; 224/275; 244/118.6

(58) Field of Classification Search ........... 296/37.15, 296/65.01; 297/188.01, 188.08, 188.11, 297/188.12, 188.13; 224/275; 244/118.6
See application file for complete search history.

(56) References Cited

U.S. PATENT DOCUMENTS

| | | | |
|---|---|---|---|
| 4,573,731 A * | 3/1986 | Knaack et al. ............ 296/37.6 |
| 5,398,987 A * | 3/1995 | Sturgis ..................... 296/37.6 |
| 5,624,160 A | 4/1997 | Koch et al. |
| 5,921,629 A | 7/1999 | Koch et al. |
| 6,390,547 B1 * | 5/2002 | Spykerman |
| 6,412,864 B1 | 7/2002 | Larson |
| 6,691,952 B2 * | 2/2004 | Keogh |

OTHER PUBLICATIONS

U.S. Appl. No. 10/943,272, filed Sep. 17, 2004, Williamson et al.
U.S. Appl. No. 10/943,672, filed Sep. 17, 2004, Meneses et al.
U.S. Appl. No. 10/944,134, filed Sep. 17, 2004, Williamson et al.
U.S. Appl. No. 10/944,487, filed Sep. 17, 2004, Williamson et al.

* cited by examiner

*Primary Examiner*—Stephen Gordon
(74) *Attorney, Agent, or Firm*—Drinker Biddle & Reath LLP

(57) ABSTRACT

An improved door and drawer assembly for use with a seat on a passenger vehicle. The door and drawer assembly are installed in the passenger vehicle independent of the seat and thus not physically connected to the seat frame. Any load that is applied to the seat frame during movement of the vehicle or caused by passenger movement or support is not imposed on the door and drawer assembly. Accordingly, the operation of the door and drawer assembly is not adversely affected by the loads imposed on the seat frame. Alternatively, the drawer assembly can be excluded so that the door assembly can provide access to an area under the seat in which emergency equipment, such as a life raft bag assembly and life vests, can be stored.

10 Claims, 13 Drawing Sheets

INDEPENDENT DIVAN DOOR AND DRAWER ASSEMBLY

CROSS-REFERENCE TO RELATED PATENT APPLICATION

Related subject matter is disclosed in copending U.S. patent application Ser. No. 10/944,487, filed Sep. 17, 2004, entitled ATTACHMENT ASSEMBLY FOR MOUNTING A SEAT TO THE FLOOR OF A VEHICLE; U.S. patent application Ser. No. 10/944,134, filed Sep. 17, 2004, entitled A CURVED PROFILE TRACKING PLATFORM FOR A PASSENGER SEAT; U.S. patent application Ser. No. 10/944,272, filed Sep. 17, 2004, entitled FLEXIBLE SEAT FRAME, which issued as U.S. Pat. No. 7,080,881; and U.S. patent application Ser. No. 10/943,672, filed Sep. 17, 2004, entitled ADJUSTABLE SEAT BELT GUIDE ASSEMBLY.

FIELD OF THE INVENTION

The present invention relates to an improved divan door and drawer assembly. More particularly, the present invention relates to a divan door and drawer assembly that is independent of the divan itself and made for use in a vehicle such as a passenger airplane or the like.

BACKGROUND OF THE INVENTION

Due to the limited amount of space that is available on large passenger vehicles such as business or commercial airplanes, trains, buses and so on, it is often necessary to store items underneath the passenger seats. Typically, passengers will be required during take-off and landings of an aircraft to place loose items under their seat or the seat in front of them. Also, emergency equipment such as life vests and so on can be stored under passenger seats for easy access during an emergency.

Due to the movement of the vehicle, items placed under passenger seats will often shift their positions and move into the seating area or aisle, thus becoming difficult to find or creating a potential safety hazard. Accordingly, storage compartments such as bins or drawers have been developed that can fit underneath a passenger seat and thus provide a more secure storage area for items or emergency equipment. These types of bins or drawers are directly attached to the seat frame, which is also referred to as a divan frame. However, several problems exist with these types of drawers. In particular, these types of drawers have limited storage weight capacity because they can become overloaded and thus detach from the divan frame. Also, movement of the vehicles causes the seats to experience certain loading forces, especially when occupied by a passenger. These loading forces can cause the seat frame to become slightly bent or skewed, which adversely affects the operation of the drawer to close or slide in and out properly.

Accordingly, a need exists for an improved drawer assembly for use with a seat on a passenger vehicle.

BRIEF SUMMARY OF THE INVENTION

An embodiment of the present invention provides a door and drawer assembly for use with a seat on a passenger vehicle. The door and drawer assembly are installed in the passenger vehicle independent of the seat, that is, they are not physically connected to the seat frame. Therefore, any load that is applied to the seat frame during movement of the vehicle or caused by passenger movement or support is not imposed on the door and drawer assembly. Accordingly, the operation of the door and drawer assembly is not adversely affected by the loads imposed on the seat frame.

Another embodiment of the present invention provides a door assembly for use with a seat on a passenger vehicle. The door assembly is installed in the passenger vehicle independent of the seat, that is, it is not physically connected to the seat frame. Therefore, any load that is applied to the seat frame during movement of the vehicle or caused by passenger movement or support is not imposed on the door assembly. Accordingly, the operation of the door assembly is not adversely affected by the loads imposed on the seat frame. The door assembly provides access to an area under the seat in which emergency equipment, such as a life raft bag assembly and life vests, can be stored.

BRIEF DESCRIPTION OF THE DRAWINGS

These and other advantages and novel features of the invention will be more readily appreciated from the following detailed description when read in conjunction with the accompanying drawings, in which.

DETAILED DESCRIPTION OF THE PREFERRED EMBODIMENTS

Figure 1:
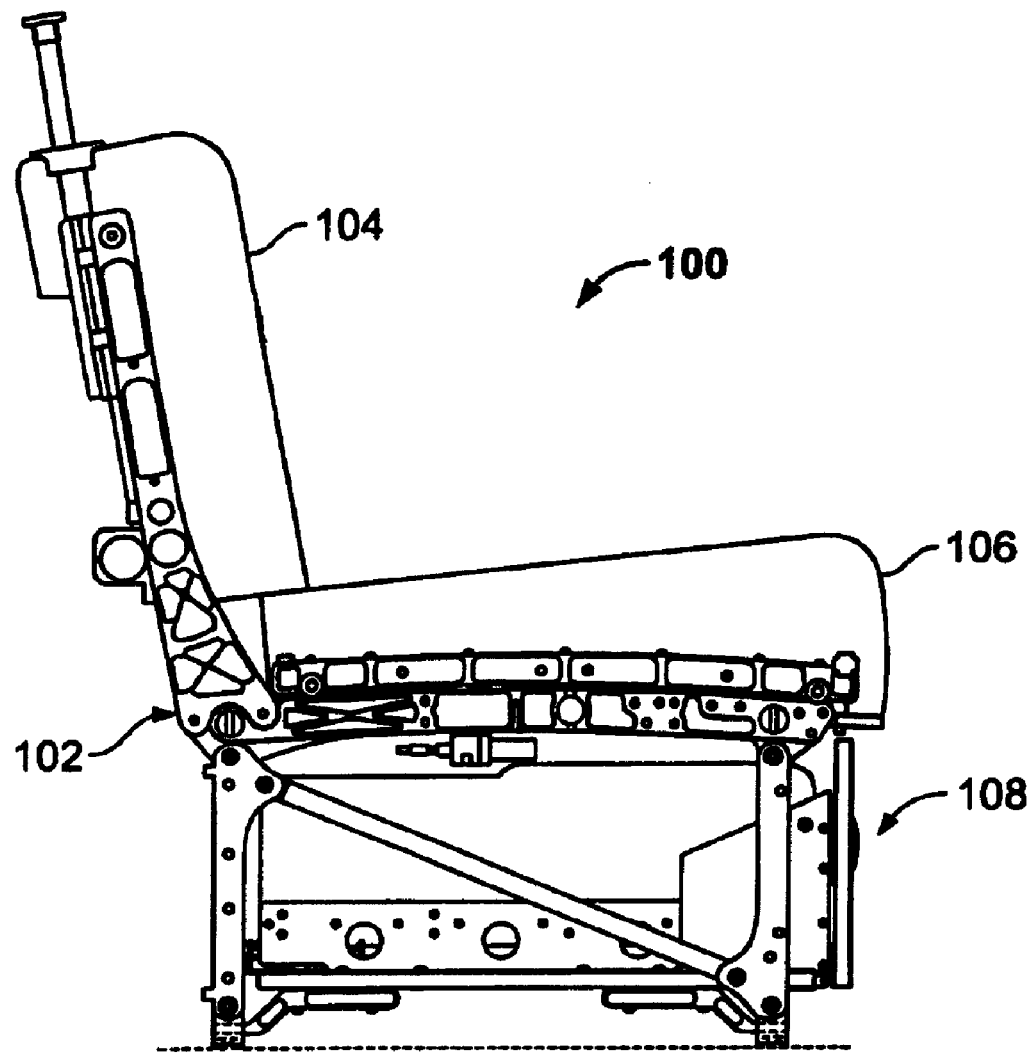
FIG. 1 is a schematic illustrating a side view of a door and drawer assembly for use with a passenger seat according to an embodiment of the present invention.

FIG. 1 is a schematic side view of a seat assembly 100 comprising a seat frame 102, an upright seat cushion 104 and a horizontal seat cushion 106 under which a door and drawer assembly 108 according to an embodiment of the present invention is disposed. As shown in more detail in FIG. 2, the door and drawer assembly 108 includes a drawer assembly 110 and a door assembly 112 that is attached to the drawer assembly 110 by hinge assemblies 109 as described in more detail below. The door of the door assembly 112 has handles 113 for ease of access by a user.

Specifically, as shown in FIGS. 2-12, the drawer assembly 110 includes a bottom panel 114, a plurality of rails 116, and a drawer 118 that is slidably attached to the bottom panel 114 by the rails 116 so that the drawer 118 can slide in the direction indicated by arrows A and B. The rails are attached to the bottom panel 114 and drawer 118 by screws, rivets or any other suitable fasteners. The door portion of the door assembly 112, the bottom panel 114 and the drawer 118 can be made out of metal, plastic, composite or any other suitable material. The rails 116 are typically made of a type of metal, but can be made of any suitable material.

As shown in more detail in FIGS. 3-8, a plurality of mounting assemblies 120 are attached to the underside of the bottom panel 114 by screws, rivets or any other suitable fastener. As shown in FIG. 1, the mounting assemblies 120 are attached directly to the floor tracks of the vehicle, such as to the floor tracks of an aircraft under the horizontal seat cushion 106 of the seat assembly 100. The mounting assemblies 120 are typically made of a type of metal, but can be made of any suitable material, and can be attached to the floor tracks by screws, rivets or any other suitable fastening mechanism. It is noted that the mounting assemblies 120 are not attached to the seat frame 102, and therefore, any load imposed on the seat frame 102 is not transferred to the mounting assemblies 120 and thus not to the drawer and door assembly 108.

Figure 8:
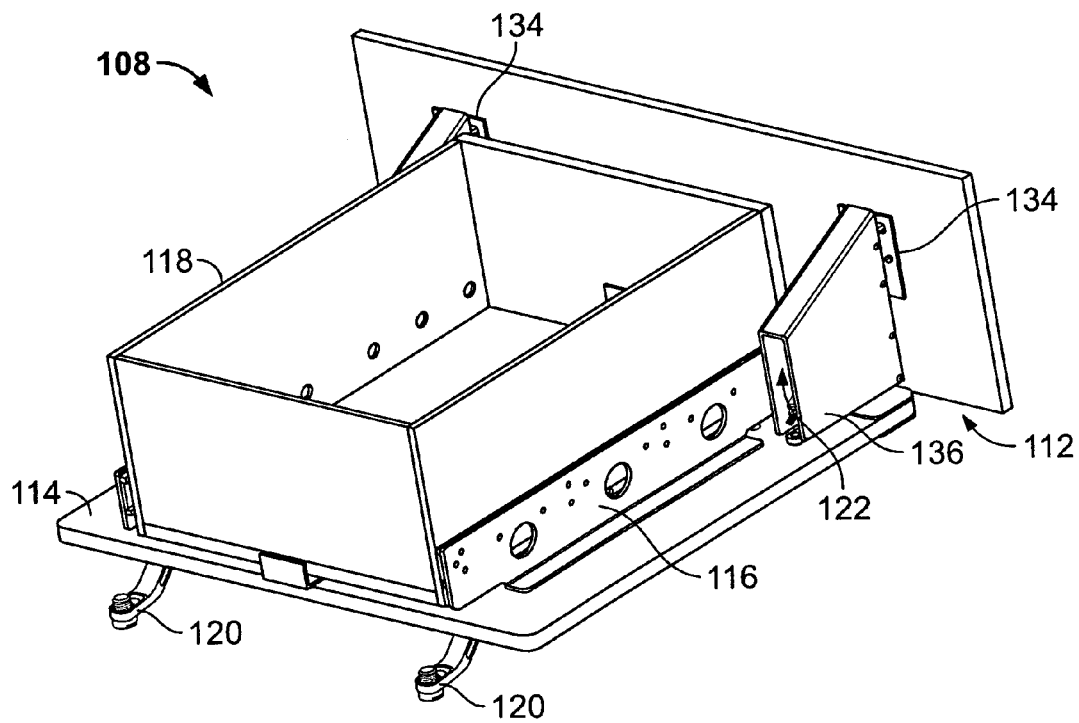
FIG. 8 is a rear perspective view as shown in FIG. 7, including a cosmetic shroud to hide the door hasp mechanism.
Figure 9:
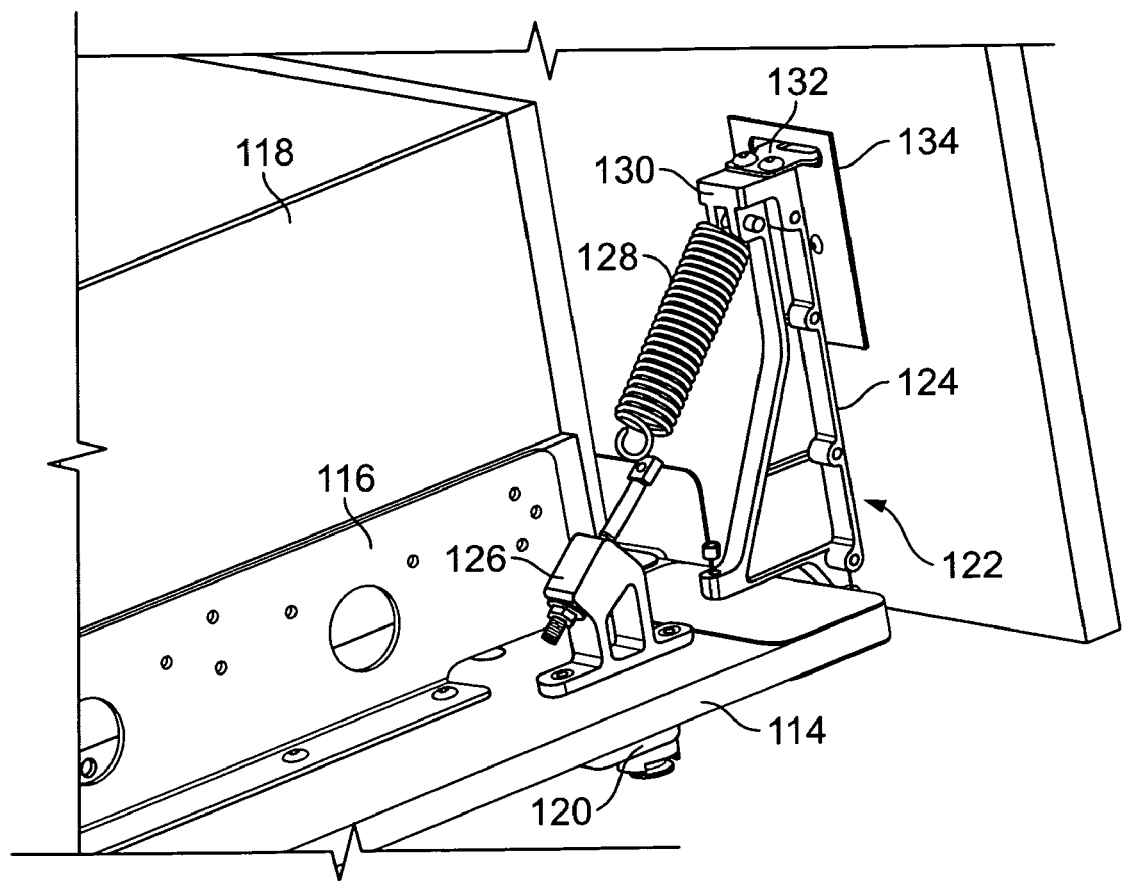
FIG. 9 is a detailed perspective view of the door hasp lock mechanism of the door and drawer assembly shown in FIG. 2.

As shown in more detail in FIGS. 7-10, the door and drawer assembly 108 further includes a door latch assembly 122 which comprises a door hasp lock mechanism 124, a spring mounting bracket 126 and a spring 128. As indicated, two door latch assemblies 122 are pivotably mounted by pivots 123 on opposite sides of the drawer 118. The door hasp lock mechanism 124 is attached to the bottom plate 114 by screws, rivets or any other suitable fastening mechanism. The spring 128 is attached to an attachment point 130 near the top of the door hasp lock mechanism 124, and to the spring mounting bracket 126 as illustrated. The door latch assembly 122 includes a door hasp 132 mounted at the top of the door hasp lock mechanism 124 by screws, rivets or any other suitable fastener, and engages with a respective latch mechanism 134 in the door assembly 112 when the door of the door assembly 112 is moved to the closed position as shown, for example, in FIGS. 7-9. All of these components can be made of metal or any other suitable material. The spring loaded door latch assembly 122 reduces the rigidity of the assembly and thus allows the door assembly 112 to articulate to withstand dynamic loading during, for example, movement of the vehicle. Accordingly, the door assembly 112 and door latch assemblies 122 are less likely to become out of alignment to a degree that would cause the door hasp 132 to be unable to engage with the lock mechanism 134. In addition, a cosmetic shroud 136 can be used to cover the door latch assembly 122 as illustrated in FIG. 8. The cosmetic shroud 136 can be made of metal or any other suitable material.

Figure 2:
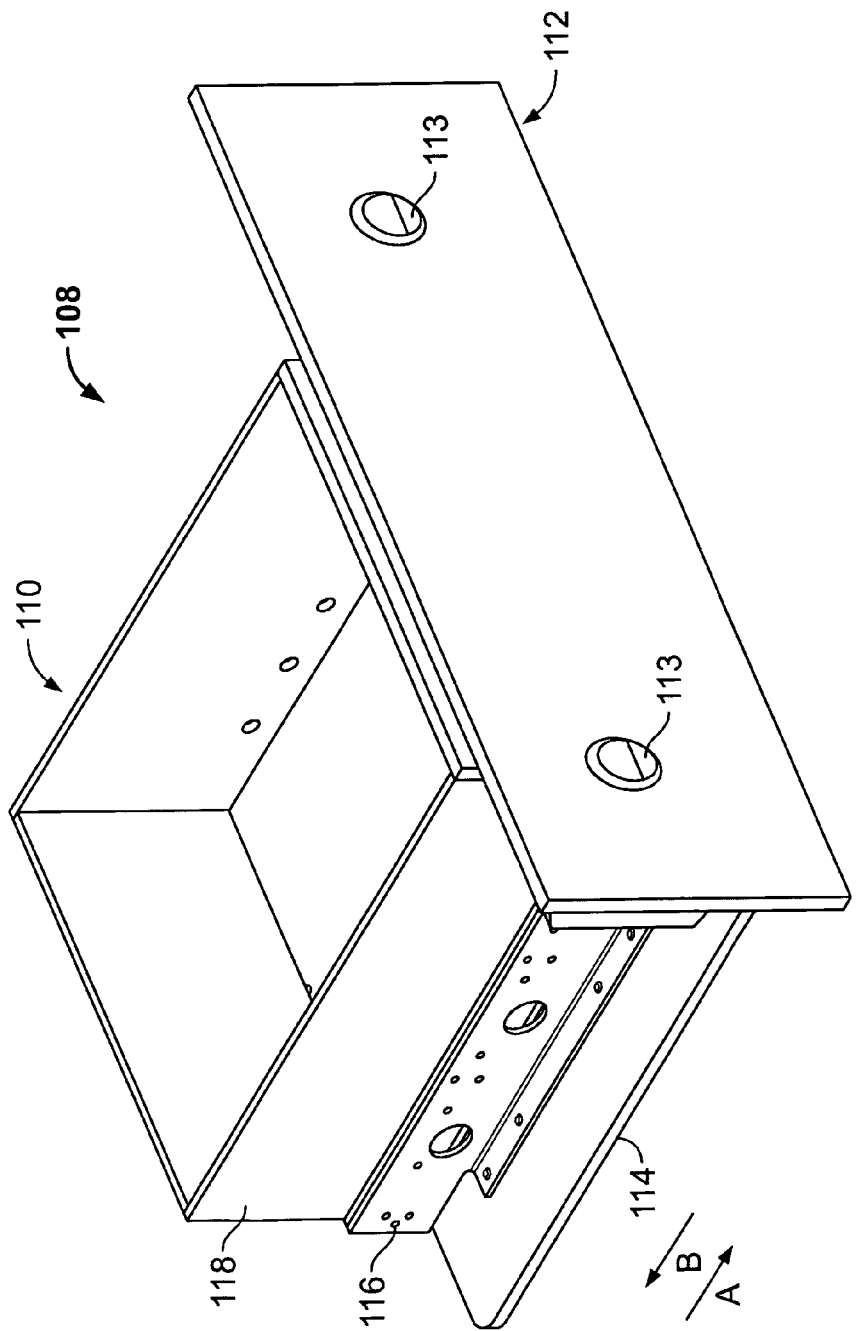
FIG. 2 is a top perspective view of the door and drawer assembly shown in FIG. 1.
Figure 3:
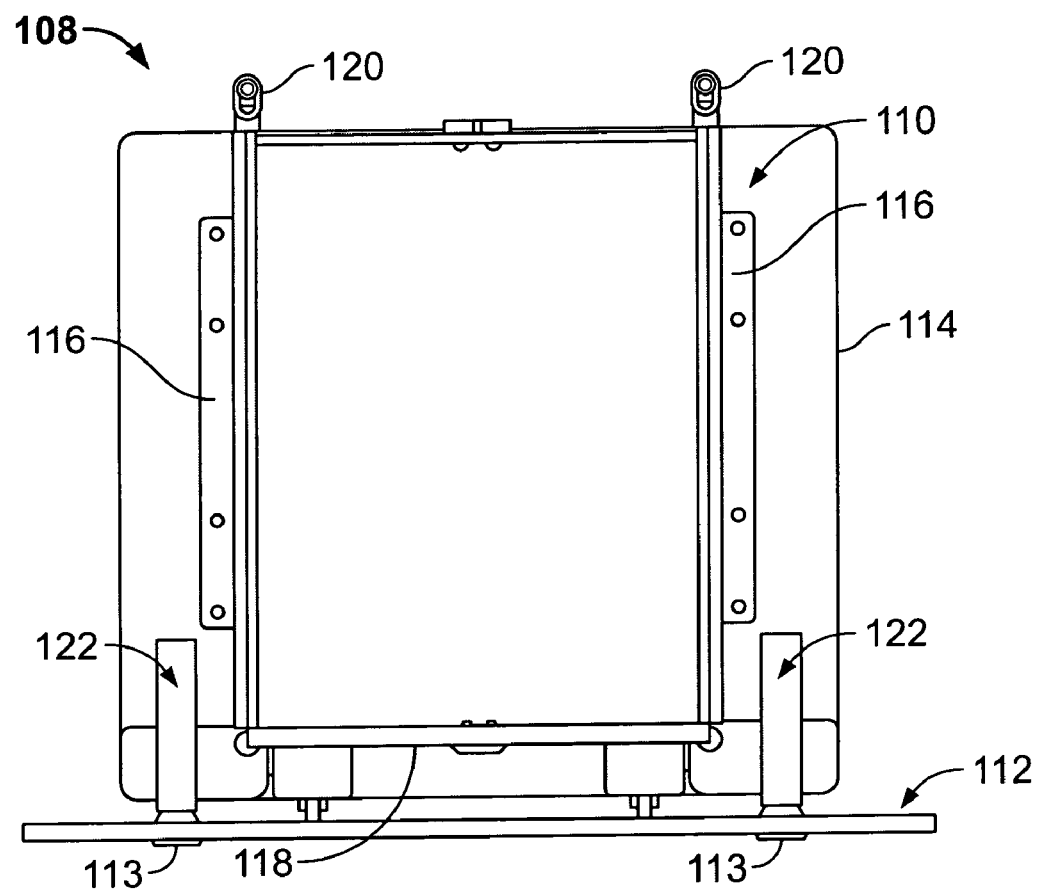
FIG. 3 is a schematic top view of the door and drawer assembly shown in FIG. 2.
Figure 4:
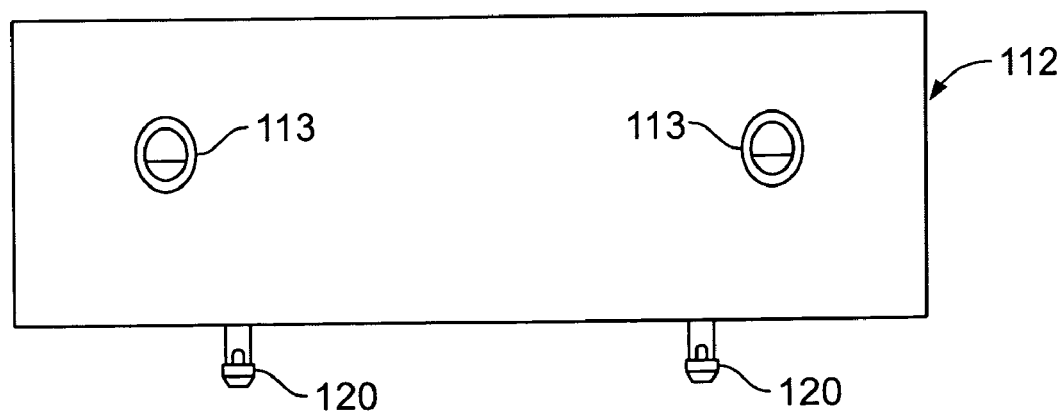
FIG. 4 is a schematic front view of the door and drawer assembly shown in FIG. 2.
Figure 5:
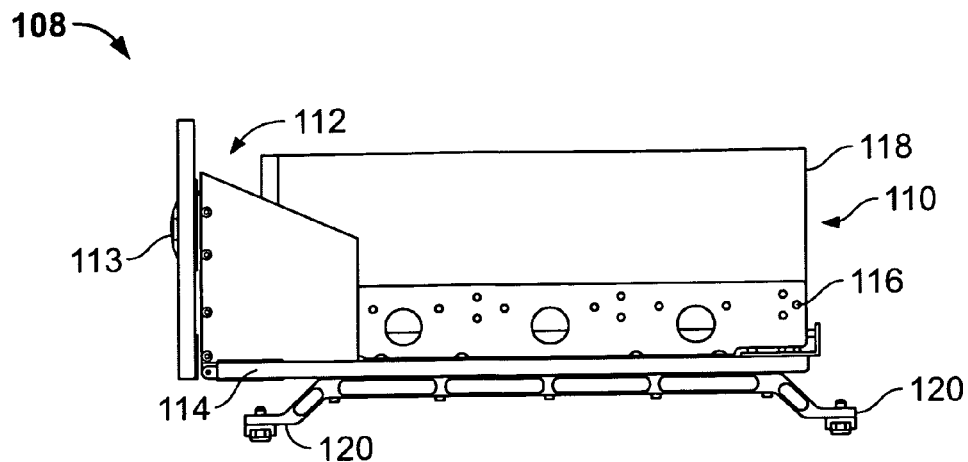
FIG. 5 is a schematic side view of the door and drawer assembly shown in FIG. 2.
Figure 6:
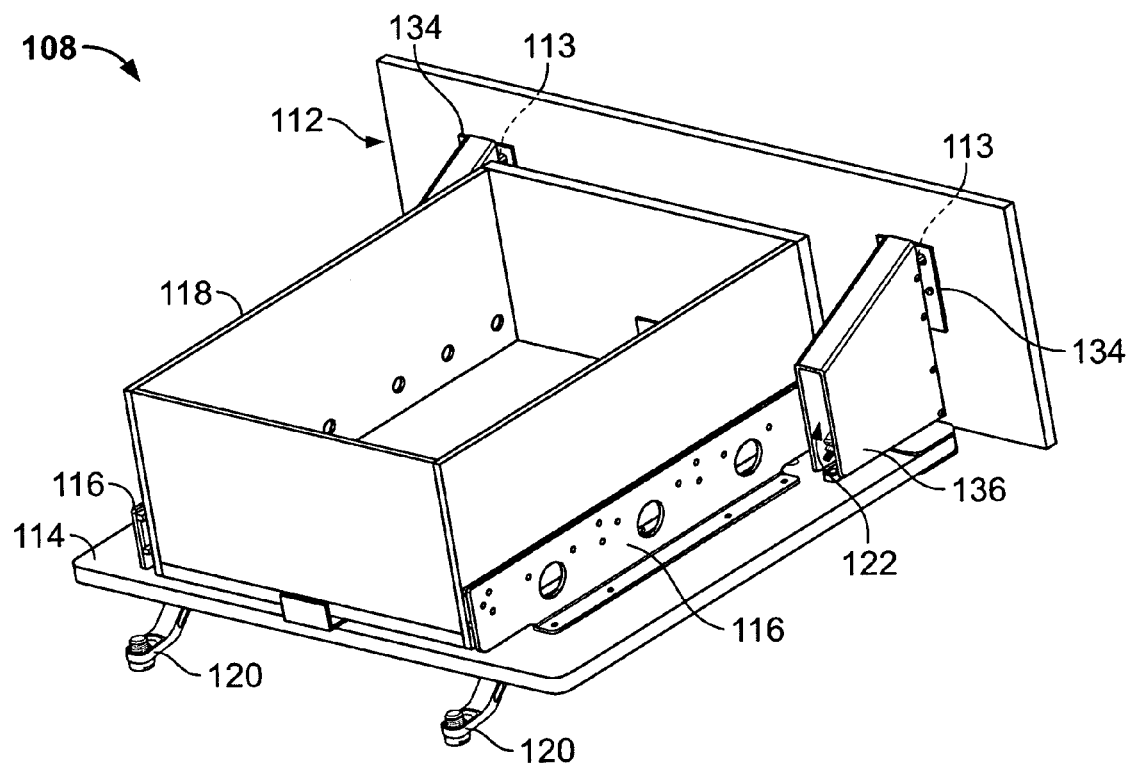
FIG. 6 is a perspective view of the door and drawer assembly shown in FIG. 2.
Figure 7:
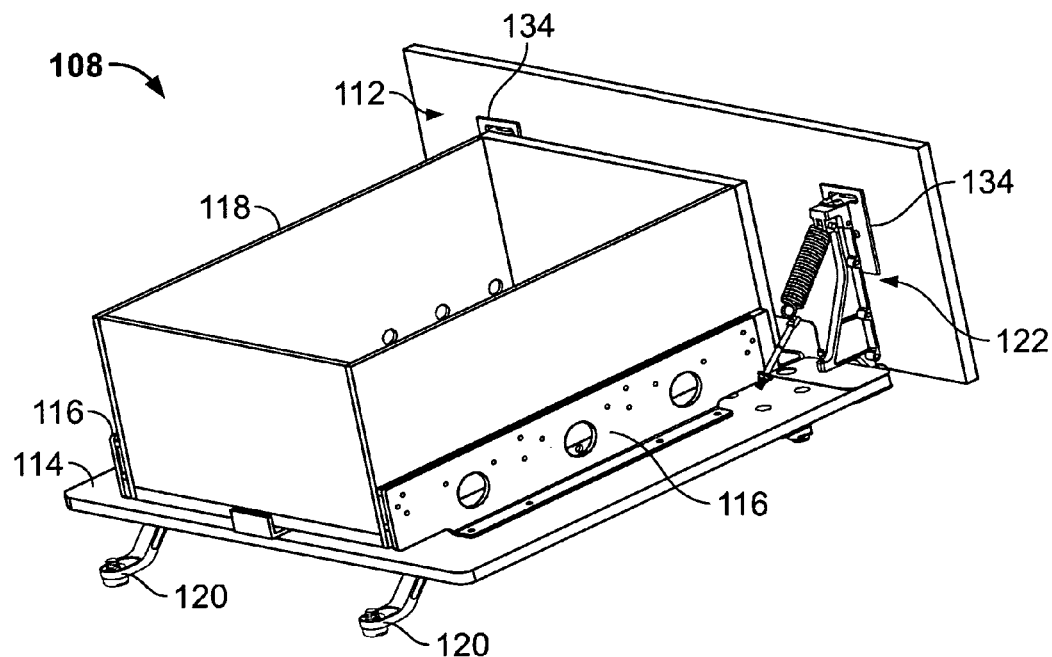
FIG. 7 is a rear perspective view of the door and drawer assembly shown in FIG. 2.
Figure 10:
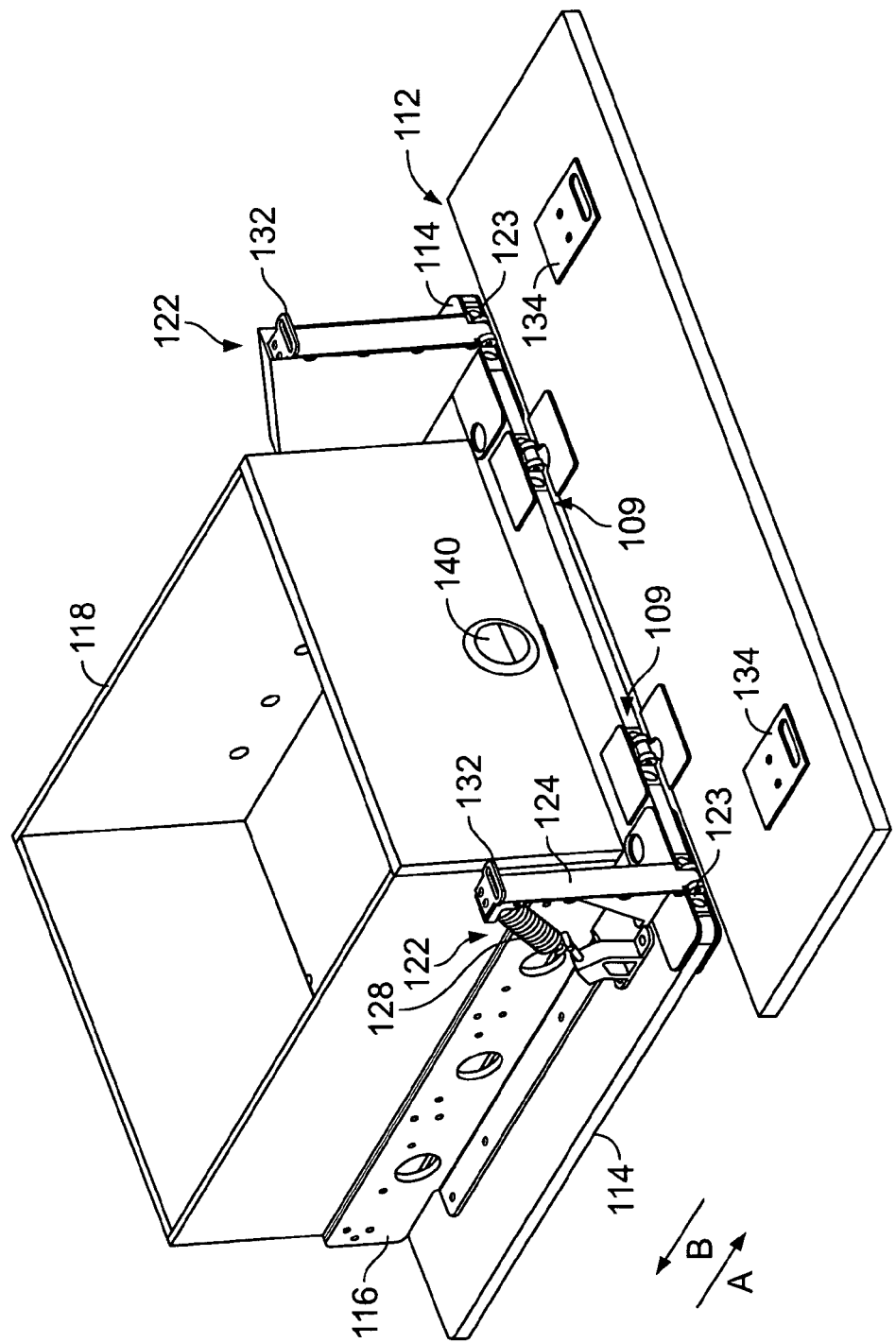
FIG. 10 is a front perspective view of the door and drawer assembly shown in FIG. 2 illustrating the door in an open position.
Figure 11:
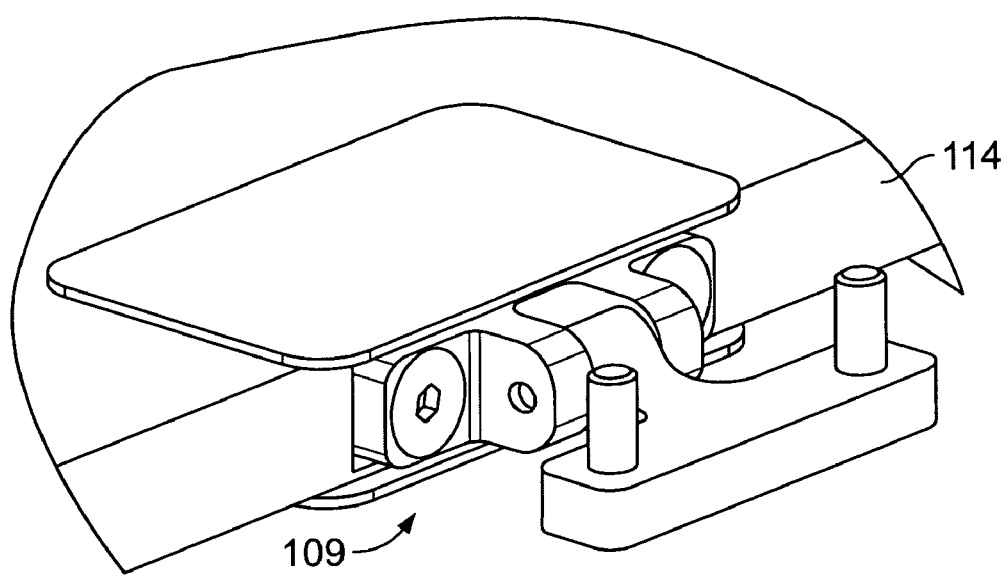
FIG. 11 is a detailed perspective view of the hinge assembly in the open position as shown in FIG. 10.
Figure 12:
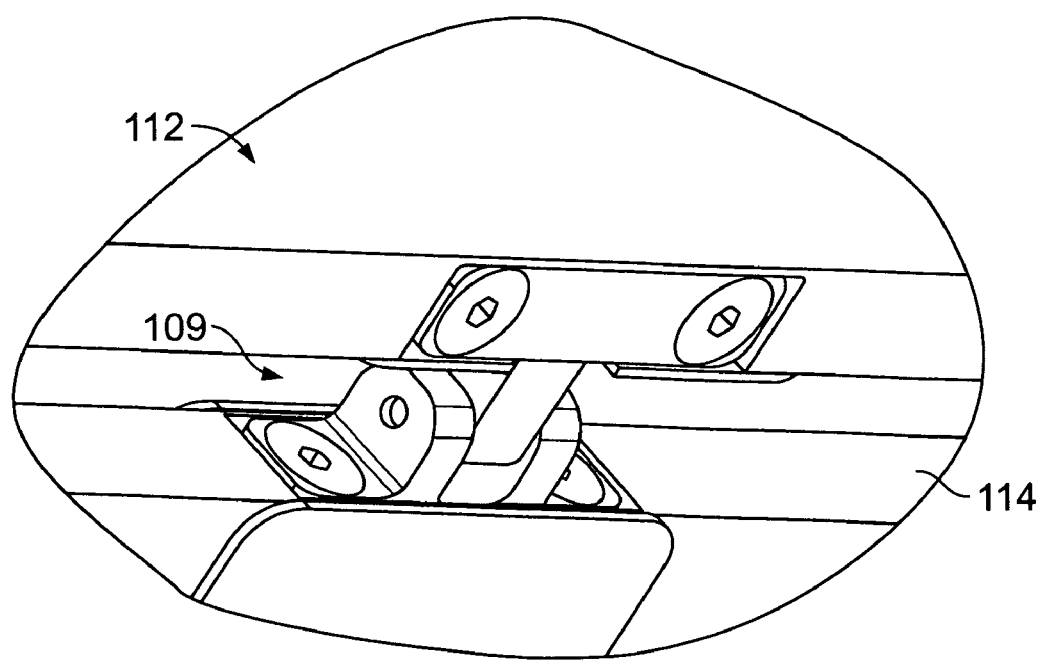
FIG. 12 is a detailed bottom perspective view of the hinge assembly in the open position as shown in FIG. 10.
Figure 13:
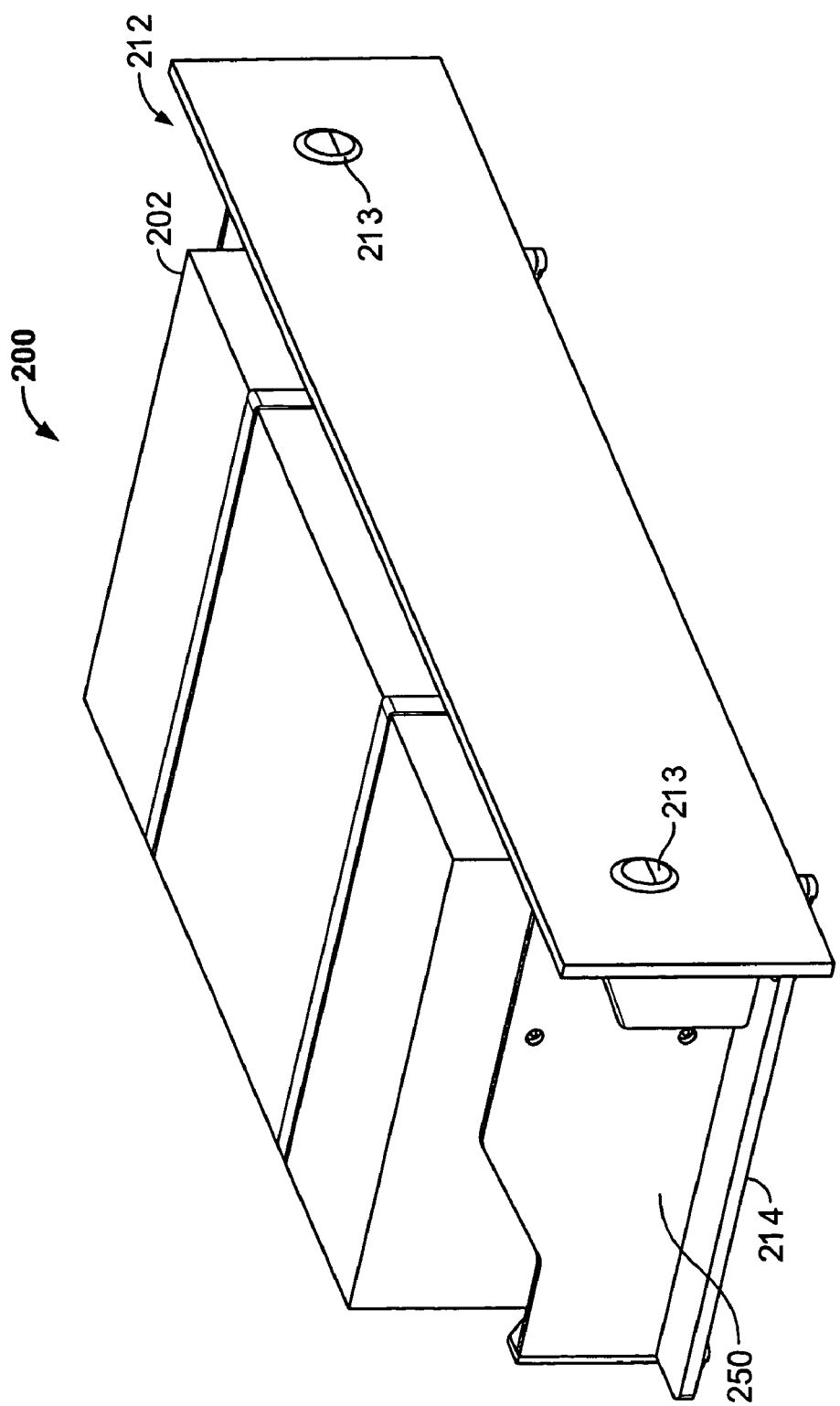
FIG. 13 is a front perspective view of a door assembly according to another embodiment of the present invention, which is adapted to store a life raft bag assembly and life vests.
Figure 14:
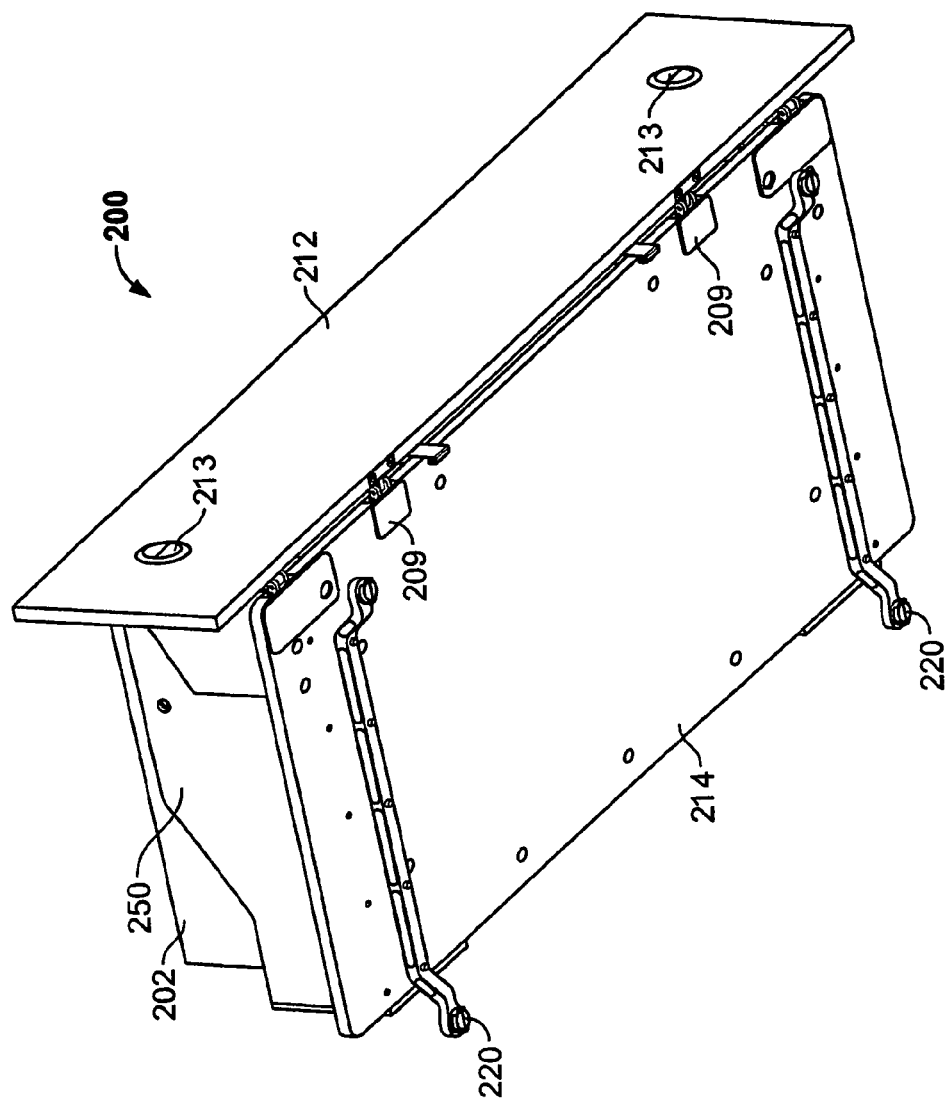
FIG. 14 is a bottom perspective view of the door assembly as shown in FIG. 13.
Figure 15:
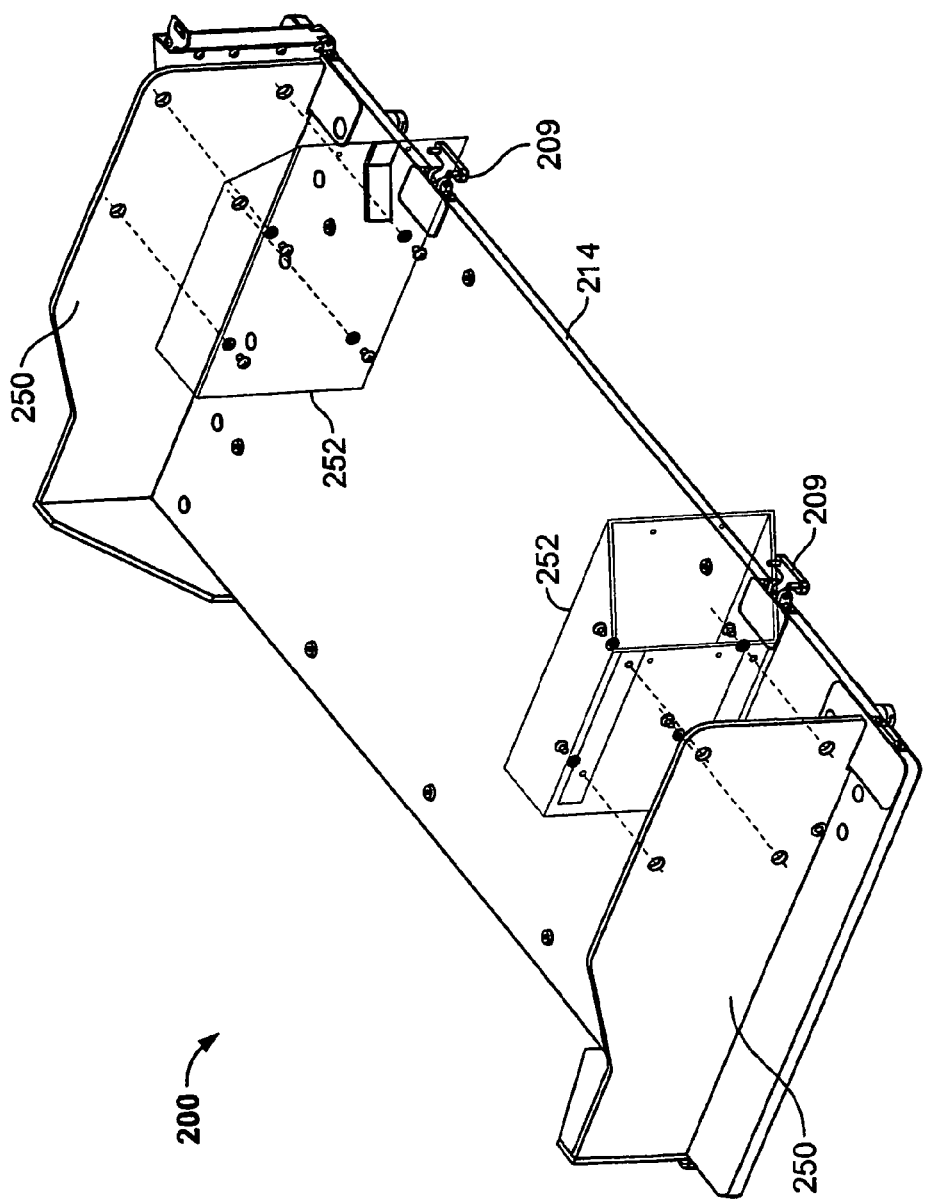
FIG. 15 is an exploded perspective view showing examples of life vest pouches assembled to the sides of the door assembly as shown in FIG. 13.

As illustrated in FIGS. 9-12, the door assembly 112 is attached to the bottom plate 114 by a plurality of hinge assemblies 109. The hinge assemblies 109 are attached to the bottom plate 114 and door assembly 112 by screws, rivets or any other suitable fastening mechanism, and pivot about their respective hinge axis to enable the door assembly 112 to be moved between an open position as shown in FIG. 10 and a closed position as shown in FIGS. 2 and 6-9, for example. Accordingly, when the door of the door assembly 112 is moved to the open position as shown in FIG. 10, a user can grab the handle 140 of the drawer 118 and thus slide the drawer 118 out from under the seat in a direction of arrow A as shown in FIGS. 2 and 10 to access the interior of the drawer 118. When finished, the user can slide the drawer 118 in the direction of arrow B back under the seat and close the door.

As discussed briefly above, it is also noted that the door and drawer assembly 108 can be configured to store emergency equipment. For example, as shown in FIGS. 13-17, a door assembly 200 can be made in a manner similar to door and drawer assembly 108 without the drawer assembly 110 to accommodate a life raft bag assembly 202 and a plurality of life vests (not shown).

Specifically, the door assembly 200 includes a door assembly 212 and a bottom panel 214 that are similar to door assembly 112 and bottom panel 114 described above. The bottom panel 214 is attached to the floor tracks of the vehicles, such as the floor tracks of an aircraft, by mounting assemblies 220 which are similar in all respects to mounting assemblies 120 described above. The door assembly 212 is attached to bottom plate 214 by hinge assemblies 209 which are similar in all respects to hinge assemblies 109 as described above, and has handles 213 which are similar to handles 113 described above. Also, the assembly 200 includes a plurality of door hasp lock mechanism assemblies 222 having pivots 223 similar to door hasp lock mechanisms 122 and pivots 123 as described above, which can be covered by shrouds 236 that are similar to shrouds 136 described above. The door assembly 212 can thus be pivoted about hinge assemblies 209 into open and closed positions in manners similar to that described above with regard to door assembly 112.

Figure 16:
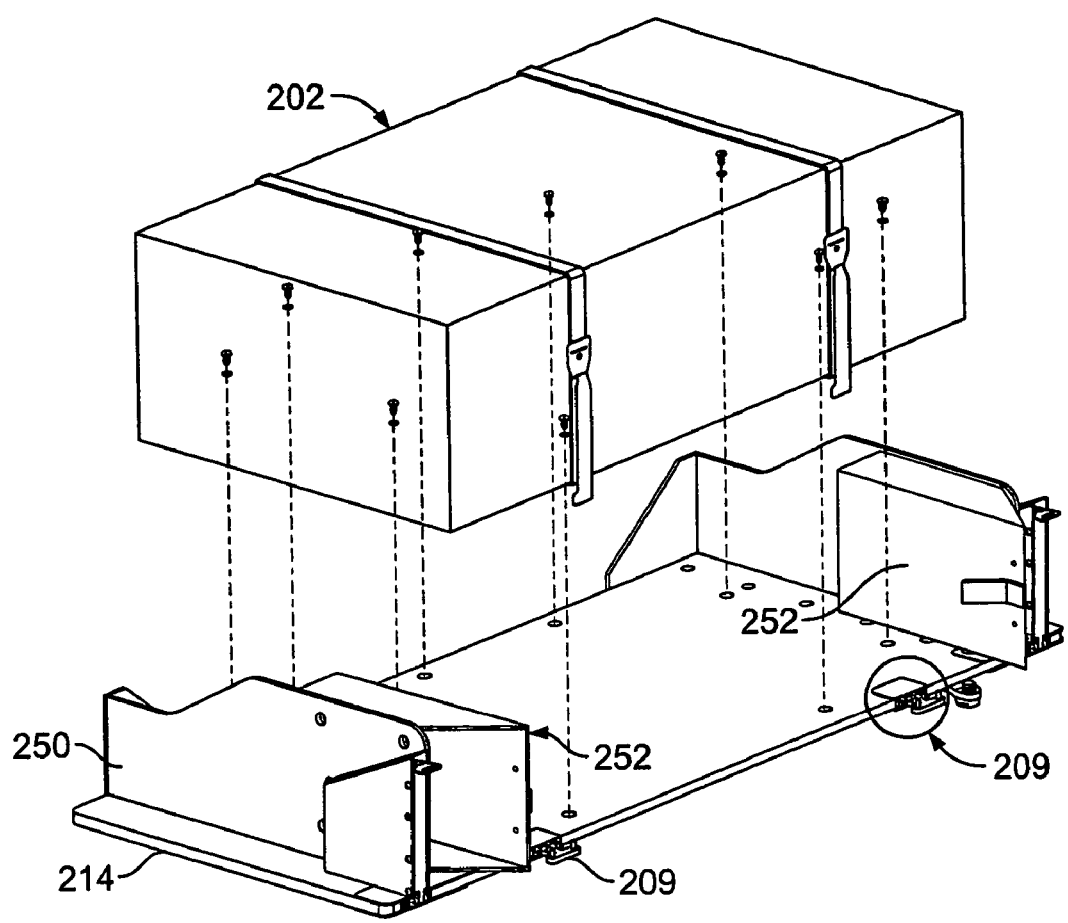
FIG. 16 is an exploded perspective view of the door assembly as shown in FIG. 13, including the life vest pouches and life vest bag assembly.
Figure 17:
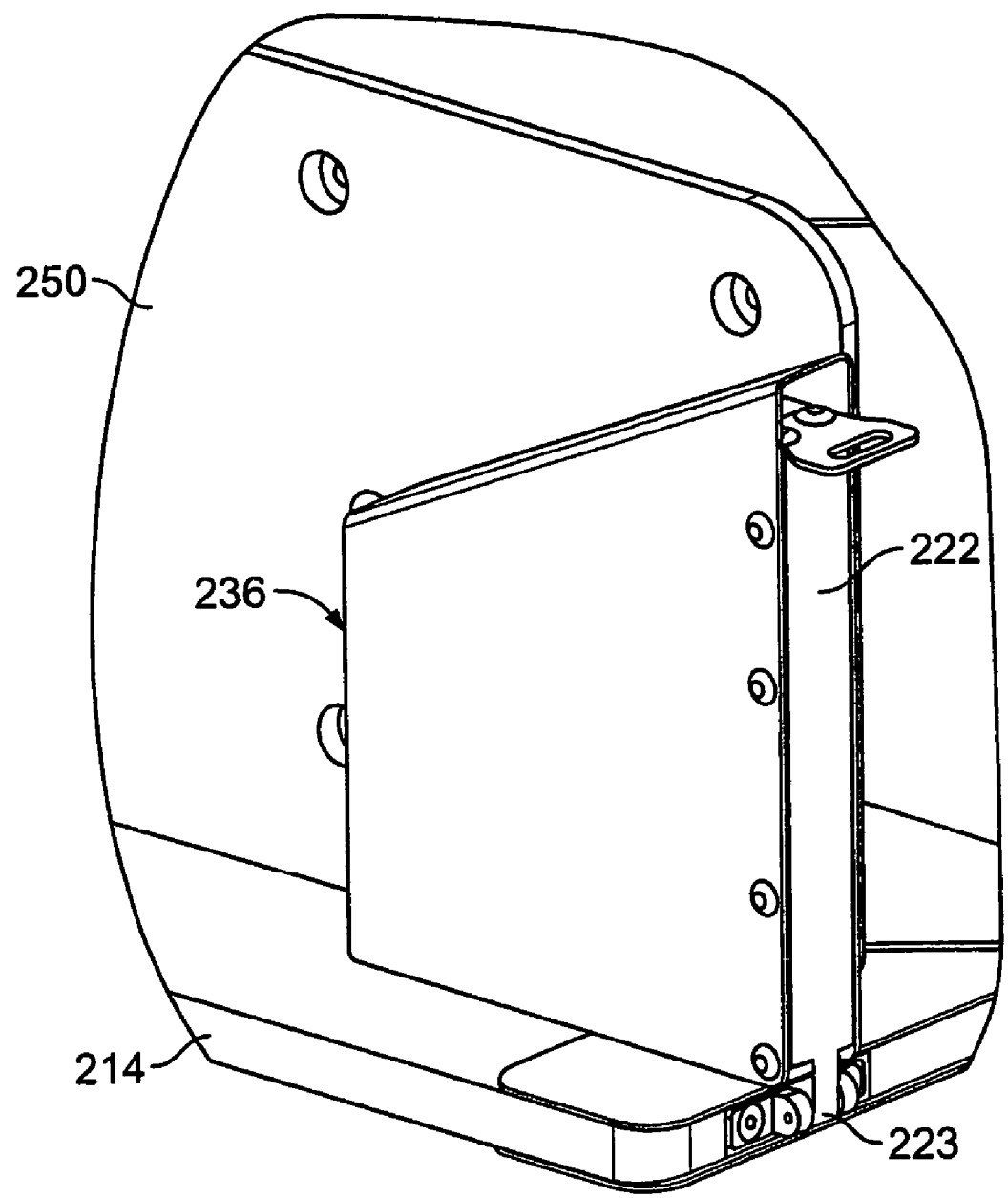
FIG. 17 is a detailed perspective view of the flexible latch assembly for the door of the door assembly as shown in FIG. 13.

However, instead of having the drawer assembly 110, the assembly 200 includes side panels 250 which are mounted to the bottom plate 214 by screws, rivets or any other suitable fastening mechanism. Life vest pouches 252 are mounted to the inside of each side panel 250 as shown, for example, in FIG. 16 by screws, rivets or any other suitable fastening mechanism. Accordingly, as shown in FIG. 16, a life raft bag assembly 202 can be stored in the drawer assembly 200, and can be accessed by opening the door assembly 212 in a manner similar to that in which door assembly 112 is opened as described above. Because the assembly 200 is not attached to the seat frame 102 (see FIG. 1), any load that is imposed on the seat is not transferred to the assembly 200 and thus, the assembly 200 is much less susceptible to damage and its operation remains much more reliable.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A seat assembly, adapted for use on a passenger vehicle having a passenger area with a floor, the seat assembly comprising:

a seat frame including a base portion coupled to a first portion of the floor of the passenger vehicle and a generally horizontal seating surface having a seating width and a seating depth; and a storage assembly configured directly under the seating surface, the storage assembly having a width substantially similar to the seating width and a depth substantially similar to the seating depth, and wherein the storage assembly is coupled to a second portion of the floor of the passenger vehicle such that the storage assembly is substantially isolated from and unaffected by a load imposed on the seat frame, wherein the storage assembly comprises:

an assembly mounting portion that couples with the second portion of the floor of the passenger vehicle; and a door assembly, pivotably coupled to the assembly mounting portion independent of the seat frame, and adapted for movement between a closed position to prevent access to a storage location in the storage assembly and an open position to permit access to the storage location;

the assembly mounting portion and door assembly being substantially isolated from and unaffected by a load imposed on the seat frame.

2. A seat assembly as claimed in claim 1, wherein the storage assembly further comprises:

a drawer assembly, movably coupled to the assembly mounting portion independent of the seat frame, and being adapted to move between a position inside the storage location and a position outside the storage location.

3. A seat assembly as claimed in claim 2, wherein the storage assembly further comprises:

at least one rail assembly, adapted to slidably couple the drawer assembly to the assembly mounting portion.

4. A seat assembly as claimed in claim 3, wherein the at least one rail assembly comprises:

two assemblies coupled on opposite sides of the drawer assembly.

5. A seat assembly as claimed in claim 1, wherein the storage assembly, further comprises:

at least one door lock assembly, coupled to the assembly mounting portion and adapted to releasably lock the door assembly in the closed position.

6. A seat assembly as claimed in claim 5, wherein:

the at least one door lock assembly further comprises a spring, adapted to allow articulation of the door assembly when the door assembly is releasably locked in the closed position.

7. A seat assembly as claimed in claim 5, wherein:

the at least one door lock assembly further comprises a hasp, adapted to releasably couple to a latch mechanism on the door assembly when the door assembly is in the closed position.

8. A seat assembly as claimed in claim 1, wherein the assembly mounting portion is configured for attachment to a floor track of the floor.

9. A seat assembly as claimed in claim 8, wherein:

the passenger vehicle is an airplane.

10. A seat assembly as claimed in claim 1, wherein the storage assembly further comprises:

at least one hinge, adapted to pivotably couple the door assembly to the assembly mounting portion independent of the seat frame.

* * * * *